United States Patent
Reynolds et al.

(10) Patent No.: US 11,650,729 B2
(45) Date of Patent: *May 16, 2023

(54) SYSTEMS AND METHODS FOR ASSISTING WITH COLOR SELECTION

(71) Applicant: Behr Process Corporation, Santa Ana, CA (US)

(72) Inventors: Damien Reynolds, Huntington Beach, CA (US); Tanuja Singeetham, Pasadena, CA (US)

(73) Assignee: Behr Process Corporation, Santa Ana, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/453,561

(22) Filed: Nov. 4, 2021

(65) Prior Publication Data
US 2022/0057924 A1 Feb. 24, 2022

Related U.S. Application Data

(63) Continuation of application No. 17/062,915, filed on Oct. 5, 2020, now Pat. No. 11,169,682, which is a
(Continued)

(51) Int. Cl.
*G06F 3/04847* (2022.01)
*G06F 16/9535* (2019.01)
(Continued)

(52) U.S. Cl.
CPC ......... *G06F 3/04847* (2013.01); *B44D 3/003* (2013.01); *G01J 3/00* (2013.01);
(Continued)

(58) Field of Classification Search
CPC ............. G06F 3/04847; G06F 16/9535; G06F 16/248; G06F 3/0482; B44D 3/003; G01J 3/00; G01J 3/0264
See application file for complete search history.

(56) References Cited

U.S. PATENT DOCUMENTS 5,515,488 A * 5/1996 Hoppe ................. G06F 16/26
715/968
5,524,195 A * 6/1996 Clanton, III ........ H04L 12/2834
348/E5.103
(Continued)

FOREIGN PATENT DOCUMENTS

CN 1898693 A 1/2007
CN 1902652 A 1/2007
(Continued)

OTHER PUBLICATIONS

Office Action regarding Chilean Patent Application No. 201801575, dated Jun. 28, 2019. Translation provided by Clarke Modet & Co.
(Continued)

*Primary Examiner* — Nicholas Augustine
(74) *Attorney, Agent, or Firm* — Harness, Dickey & Pierce, P.L.C.

(57) ABSTRACT

Systems and methods for color selection are provided. A user device displays room types on a display, receives a room type selection indicating a particular room type, displays types of feelings, and receives a type of feeling selection indicating a particular type of feeling. The user device accesses a lookup table that associates the room types and types of feelings with paint colors such that each possible combination of room type and type of feeling is associated with a subset of paint colors. The user device determines the associated subset of paint colors in the lookup table for the combination of the particular room type and the particular type of feeling and displays the associated subset of paint colors as recommended paint colors for the combination of the particular room type and the particular type of feeling on the display of the user device.

18 Claims, 12 Drawing Sheets

Related U.S. Application Data continuation of application No. 16/003,776, filed on Jun. 8, 2018, now Pat. No. 10,824,317.

(60) Provisional application No. 62/519,641, filed on Jun. 14, 2017.

(51) Int. Cl.

| | | |
|---|---|---|
| *G06F 3/0482* | (2013.01) | |
| *G06F 16/248* | (2019.01) | |
| *B44D 3/00* | (2006.01) | |
| *G01J 3/02* | (2006.01) | |
| *G01J 3/00* | (2006.01) | |

(52) U.S. Cl.
CPC .......... *G01J 3/0264* (2013.01); *G06F 3/0482* (2013.01); *G06F 16/248* (2019.01); *G06F 16/9535* (2019.01)

(56) References Cited

U.S. PATENT DOCUMENTS

| | | | | |
|---|---|---|---|---|
| 5,610,828 | A * | 3/1997 | Kodosky | G06F 11/3664 716/139 |
| 5,737,553 | A * | 4/1998 | Bartok | G06F 3/04842 715/764 |
| 5,740,440 | A * | 4/1998 | West | G06F 8/24 715/764 |
| 5,751,287 | A * | 5/1998 | Hahn | G06F 3/0481 715/775 |
| 5,758,122 | A * | 5/1998 | Corda | G06F 8/34 717/125 |
| 5,794,178 | A * | 8/1998 | Caid | G06F 16/3347 707/999.005 |
| 5,877,766 | A * | 3/1999 | Bates | G06F 3/04855 715/854 |
| 5,933,143 | A * | 8/1999 | Kobayashi | G06T 11/206 715/805 |
| 5,990,886 | A * | 11/1999 | Serdy | G06Q 10/107 715/752 |
| 6,061,060 | A * | 5/2000 | Berry | G06F 3/0482 715/835 |
| 6,108,004 | A * | 8/2000 | Medl | G06F 3/0482 707/999.102 |
| 6,112,015 | A * | 8/2000 | Planas | H04L 41/22 715/764 |
| 6,456,296 | B1 * | 9/2002 | Cataudella | G06F 8/38 345/589 |
| 6,584,465 | B1 * | 6/2003 | Zhu | G06F 16/5854 |
| 6,756,997 | B1 * | 6/2004 | Ward, III | H04N 21/4345 348/E7.071 |
| 7,035,903 | B1 * | 4/2006 | Baldonado | H04L 67/535 709/206 |
| 7,137,074 | B1 * | 11/2006 | Newton | G06F 11/0748 715/810 |
| 7,230,629 | B2 * | 6/2007 | Reynolds | G06F 3/0482 345/589 |
| 9,530,163 | B2 | 12/2016 | Buzyn et al. | |
| 2001/0047250 | A1 * | 11/2001 | Schuller | G06T 15/04 703/1 |
| 2003/0151611 | A1 * | 8/2003 | Turpin | G06F 3/04845 345/589 |
| 2004/0059784 | A1 * | 3/2004 | Caughey | G06Q 10/107 709/206 |
| 2004/0243926 | A1 * | 12/2004 | Trenbeath | G06F 40/154 715/239 |
| 2005/0100210 | A1 * | 5/2005 | Rice | G06Q 30/02 382/162 |
| 2005/0144570 | A1 * | 6/2005 | Loverin | G06F 3/0481 715/776 |
| 2005/0144571 | A1 * | 6/2005 | Loverin | G06Q 10/107 715/776 |
| 2005/0198143 | A1 * | 9/2005 | Moody | H04L 51/216 709/206 |
| 2009/0231356 | A1 * | 9/2009 | Barnes | G06Q 30/0275 715/781 |
| 2011/0018895 | A1 * | 1/2011 | Buzyn | G06F 3/04845 345/473 |
| 2011/0018896 | A1 * | 1/2011 | Buzyn | G06F 3/04845 715/810 |
| 2012/0170840 | A1 * | 7/2012 | Caruso | G06F 3/048 382/165 |
| 2014/0075361 | A1 * | 3/2014 | Reynolds | G06Q 30/0603 715/771 |
| 2014/0108942 | A1 * | 4/2014 | Freeman | G06F 16/00 715/738 |
| 2015/0242095 | A1 * | 8/2015 | Sonnenberg | G06F 3/04842 715/810 |
| 2016/0171304 | A1 * | 6/2016 | Golding | G01J 3/528 345/632 |
| 2016/0275702 | A1 * | 9/2016 | Reynolds | G06T 7/12 |
| 2017/0132694 | A1 * | 5/2017 | Damy | G06F 3/0488 |
| 2018/0300023 | A1 * | 10/2018 | Hein | G06Q 10/06 |
| 2019/0138168 | A1 | 5/2019 | Vickers et al. | |

FOREIGN PATENT DOCUMENTS

| | | | |
|---|---|---|---|
| CN | 101474938 A | 7/2009 | |
| CN | 101826173 A | 9/2010 | |
| CN | 103745393 A | 4/2014 | |
| CN | 106202352 A | 12/2016 | |
| WO | WO-9532462 A1 * | 11/1995 | .......... G06F 3/0481 |
| WO | WO-2005048156 A1 | 5/2005 | |

OTHER PUBLICATIONS

Second Office Action regarding Chilean Patent Application No. 201801575, dated Mar. 27, 2020. Translation provided by Clarke Modet & Co.

First Office Action regarding Mexican Patent Application No. MX/a/2018/007213, dated Jan. 20, 2021. Translation provided by Clarke Modet & Co.

* cited by examiner

FIG. 4

| Room | Function | Color 1: Name / Code | Color 2: Name / Code | Color 3: Name/Code | Color 4: Name/Code | Color 5: Name/Code |
|---|---|---|---|---|---|---|
| Living Room | Warm & Friendly | Dry Brown N230-5 | Spice PPU2-18 | Oregano Spice PPU9-23 | Cork PPU6-05 | Casual Khaki N300-3 |
| Living Room | Relaxation & Calming | Rejuvenation S370-4 | Breath S360-2 | Fresh Tone S430-2 | Journeys End S520-2 | Hazy Trail N350-1 |
| Living Room | Trendy & Stylish | Beachside Drive M460-2 | Foxglove M550-3 | Sugar Poppy P170-4 | Garbanzo Paste M290-4 | Charismatic Sky M520-3 |
| Living Room | Bold & Dramatic | Gumball P120-2 | Fuzzy Duckling P270-5 | Rainwater P450-3 | Rushing Stream P480-4 | Fresh Apple P360-6 |
| Living Room | Versatile | Silver Polish BL-W13 | Painter's White PPU18-08 | Coco N270-3 | Nightingale Gray N200-3 | Urban Raincoat N440-2 |

SYSTEMS AND METHODS FOR ASSISTING WITH COLOR SELECTION

CROSS-REFERENCE TO RELATED APPLICATIONS

This application is a continuation of U.S. patent application Ser. No. 17/062,915, filed Oct. 5, 2020, which is a continuation of U.S. patent application Ser. No. 16/003,776 filed on Jun. 8, 2018, now U.S. Pat. No. 10,824,317. This application claims the benefit of U.S. Provisional Application No. 62/519,641, filed on Jun. 14, 2017. The entire disclosures of the above applications are incorporated herein by reference.

FIELD

The present disclosure relates to color selection and, more particularly, to color selection of paint colors based on a user inputted type of room to be painted and one or more user inputted purposes for the room to be painted.

BACKGROUND

This section provides background information related to the present disclosure, which is not necessarily prior art.

Consumers typically begin a new painting project because of a desire for change. This typically stems from wanting a new look, wanting to change the feeling of a room, being tired of the old look, boredom, seeing an interior elsewhere, e.g., model home tour, friend's house, magazine photo, etc., The home painting process typically starts with color selection, which can be an emotional part of the process. Many consumers are concerned with making a mistake in the color selection process. Consequently, the color selection process can take several months to years to complete as the user settles on a color.

Current systems for color selection allow a consumer to browse and select particular colors electronically using, for example, a kiosk, a website, a web application, a mobile application, etc. For example, a color selection and coordination system that allows a user to select a starting color and that provides coordinating colors for the starting color is described in U.S. Pat. No. 7,230,629, titled "Data-driven color coordinator," which is incorporated herein by reference. For further example, an automated method and apparatus for providing color selection capability is described in U.S. Pat. No. 9,530,163, titled "Automated Color Selection Method and Apparatus," which is also incorporated herein by reference.

SUMMARY

This section provides a general summary of the disclosure, and is not a comprehensive disclosure of its full scope or all of its features.

The present disclosure provides a system comprising a user device configured to receive a room type selection from a plurality of room types displayed on a display of the user device, to receive a purpose selection from a plurality of purposes displayed on the user device, to determine a plurality of recommended paint colors based on the room type selection and the purpose selection, and to display the plurality of recommended paint colors on the display of the user device. The determination of the plurality of recommended paint colors is made with a lookup table that associates particular room types and purposes with recommended paint colors.

In some configurations, the lookup table is stored in a database accessible by a server and wherein the user device is further configured to send the room type selection and the purpose selection to the server and to receive the plurality of recommended paint colors from the server.

In some configurations, the lookup table is stored on the user device and the user device is further configured to determine the plurality of recommended paint colors based on the room type selection, the purpose selection, and the lookup table.

In some configurations, the user device is further configured to receive an additional purpose selection from the plurality of purposes and to determine the plurality of recommended paint colors based on the purpose selection, the additional purpose selection, and the room type selection.

In some configurations, the plurality of recommended paint colors are displayed in a webpage within a web browser of the user device.

In some configurations, the user device is at least one of a mobile device and a tablet and wherein the plurality of recommended paint colors are displayed in a mobile application.

In some configurations, the user device is further configured to receive a color selection of at least one selected paint color from the plurality of recommended paint colors and to determine and display at least one of a coordinating color and a coordinating color palette for the at least one selected paint color.

In another form, the present disclosure provides a method that includes receiving, with a user device, a room type selection from a plurality of room types displayed on a display of the user device. The method also includes receiving, with the user device, a purpose selection from a plurality of purposes displayed on the user device. The method also includes determining, with the user device, a plurality of recommended paint colors based on the room type selection and the purpose selection. The method also includes displaying, with the user device, the plurality of recommended paint colors on the display of the user device. The determination of the plurality of recommended paint colors is made with a lookup table that associates particular room types and purposes with recommended paint colors.

In some configurations, the lookup table is stored in a database accessible by a server and the method further includes sending, with the user device, the room type selection and the purpose selection to the server and receiving, with the user device, the plurality of recommended paint colors from the server.

In some configurations, the lookup table is stored on the user device and the method also includes determining, with the user device, the plurality of recommended paint colors based on the room type selection, the purpose selection, and the lookup table.

In some configurations, the method includes receiving, with the user device an additional purpose selection from the plurality of purposes and determining, with the user device, the plurality of recommended paint colors based on the purpose selection, the additional purpose selection, and the room type selection.

In some configurations, the plurality of recommended paint colors are displayed in a webpage within a web browser of the user device.

In some configurations, the user device is at least one of a mobile device and a tablet and wherein the plurality of recommended paint colors are displayed in a mobile application.

In some configurations, the method also includes receiving, with the user device, a color selection of at least one selected paint color from the plurality of recommended paint colors and determining and displaying, with the user device, at least one of a coordinating color and a coordinating color palette for the at least one selected paint color.

In another form, the present disclosure provides a system that includes a web server configured to provide code to a user device. The code configures the user device to receive a room type selection from a plurality of room types displayed on a display of the user device, to receive a purpose selection from a plurality of purposes displayed on the user device, to determine a plurality of recommended paint colors based on the room type selection and the purpose selection, and to display the plurality of recommended paint colors on the display of the user device. The determination of the plurality of recommended paint colors is made with a lookup table that associates particular room types and purposes with recommended paint colors.

In some configurations, the lookup table is stored in a database accessible by a server and wherein the code further configures the user device to send the room type selection and the purpose selection to the server and to receive the plurality of recommended paint colors from the server.

In some configurations, the lookup table is included in the code provided to the user device and wherein the code further configures the user device to determine the plurality of recommended paint colors based on the room type selection, the purpose selection, and the lookup table.

In some configurations, the code further configures the user device to receive an additional purpose selection from the plurality of purposes and to determine the plurality of recommended paint colors based on the purpose selection, the additional purpose selection, and the room type selection.

In some configurations, the code is executed by the user device within a web browser of the user device.

In some configurations, the user device is at least one of a mobile device and a tablet and wherein the plurality of recommended paint colors are displayed in a mobile application.

In some configurations, the code further configures the user device to receive a color selection of at least one selected paint color from the plurality of recommended paint colors and to determine and display at least one of a coordinating color and a coordinating color palette for the at least one selected paint color.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a screenshot of a color selection system according to the present disclosure.

FIG. 7 is a lookup table for a color selection system according to the present disclosure.

FIG. 9 is a screenshot of a color selection system according to the present disclosure.

Corresponding reference numerals indicate corresponding parts throughout the several views of the drawings.

DETAILED DESCRIPTION

Example embodiments will now be described more fully with reference to the accompanying drawings.

The present disclosure includes color selection systems and methods that provide recommended paint colors for a user based on the user's response to questions regarding the type of room to be painted and regarding the purpose or types of feelings the user would like to be associated with the particular room. Based on the user's responses, the systems and methods provide recommended paint colors for the particular project. The color selection systems and methods can also provide coordinating colors and color palettes for one or more particular colors selected from the recommended paint colors. Once particular colors have been selected, the color selection systems and methods can also be integrated with other color coordination systems and methods that allow the user to view the particular colors in a simulated environment. For example, color coordination systems and methods that enable a user to view particular colors in a simulated environment are described in U.S. Pat. No. 7,230,629, titled "Data-driven color coordinator," which is incorporated herein by reference. The color selection systems and methods of the present disclosure can also enable a user to order samples of particular paint colors and save information associated with the particular paint colors, such as color names and identification codes, on a server for later retrieval by the user. The color selection systems and methods of the present disclosure can also enable a user to initiate a chat session with a paint expert to discuss any questions the user may have regarding the particular paint colors.

Figure 1A:
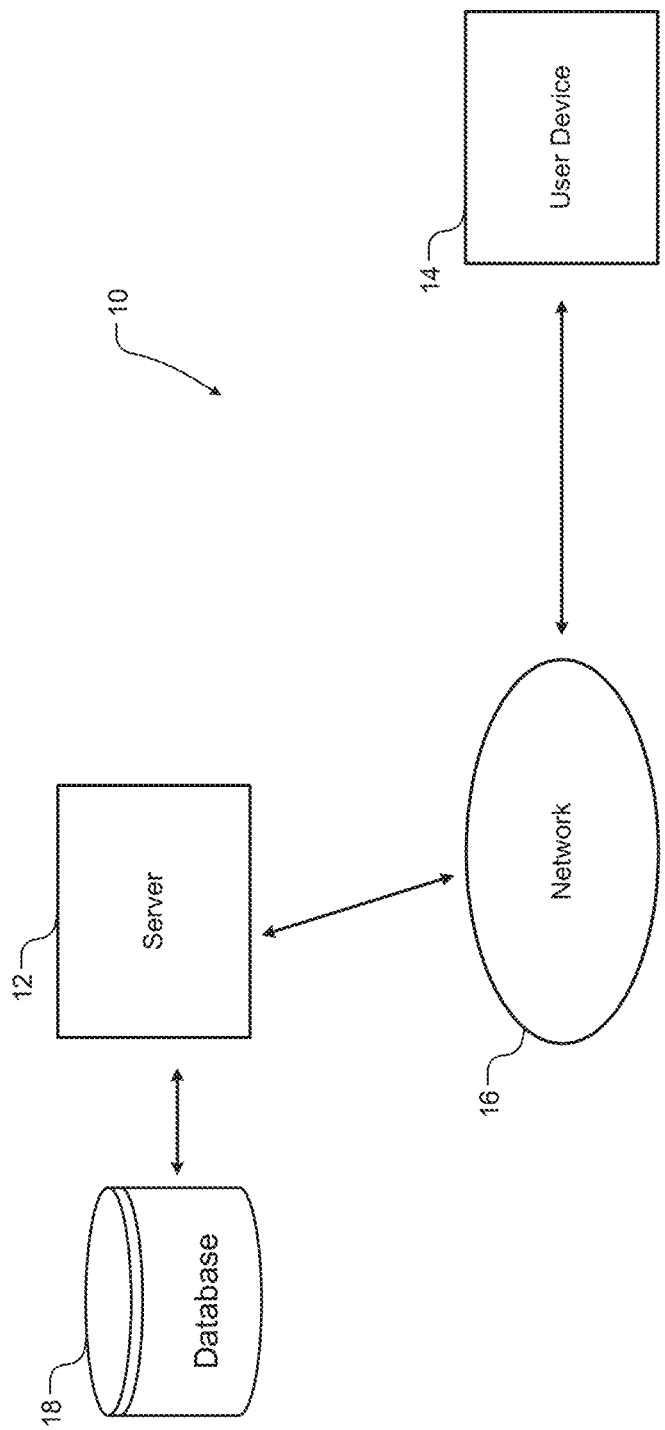
FIG. 1A is a block diagram of a color selection system according to the present disclosure.

With reference to FIG. 1, a block diagram of a color selection system 10 according to the present disclosure is shown. The color selection system 10 includes a server 12 and a user device 14 in communication over a network 16. The network 16 may be a local area network (LAN) or a wide area network (WAN), such as the internet. The server 12 is in communication with, and has access to, a color database 18. The color database 18, for example, may be a database of paint colors.

The server 12 may be a web server with one or more processors and with memory that stores content, such as webpages in Hypertext Markup Language (HTML), accessible to the user device 14 via a web browser that navigates to a website associated with the web server. For further example, the color selection system 10 according to the present disclosure may be implemented within a web application, whereby the server 12 provides code for the web application to the user device 14 and the web application runs in a web browser of the user device 14. Additionally or alternatively, the color selection system 10 according to the present disclosure may be implemented with a standalone application that runs on the user device 14 outside of a browser while communicating with the server 12. Additionally or alternatively, the color selection system 10 according to the present disclosure may be implemented with a mobile application that runs on a mobile device and/or a tablet device. The server 12 includes a network communication module to communicate with the user device 14 over the network 16.

Figure 1B:
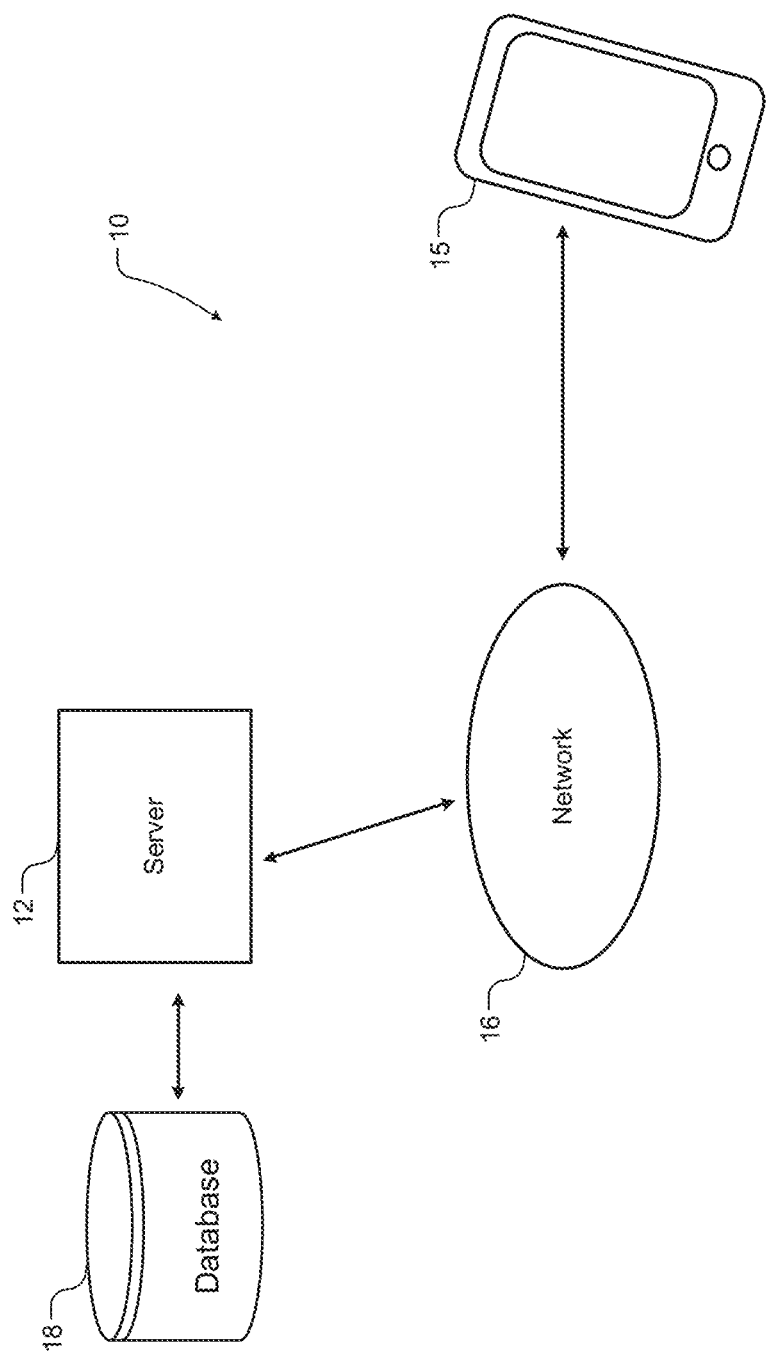
FIG. 1B is a block diagram of another color selection system according to the present disclosure.

The user device 14 is a computing device with input devices, such as a keyboard and a mouse, and a display device such as a display screen. Additionally or alternatively, the user device 14 may include a touch screen device that both receives user input and displays output. The user device includes one or more processors and memory. The memory of the user device 14 may store code for a web browser that accesses and retrieves content from websites, such as the website associated with the server 12. The memory of the user device 14 may also store code for a mobile application that provides the functionality of the color selection systems and methods of the present disclosure. The user device 14 may include a personal computer, a laptop, a tablet, and/or a mobile device, such as a smartphone. With reference to FIG. 1B, an example of the color selection system 10 of the present disclosure is shown with a tablet or mobile device 15. The user device 14 and the tablet or mobile device 15 also include a network communication module to communicate with the server 12 over the network 16.

Figure 2:
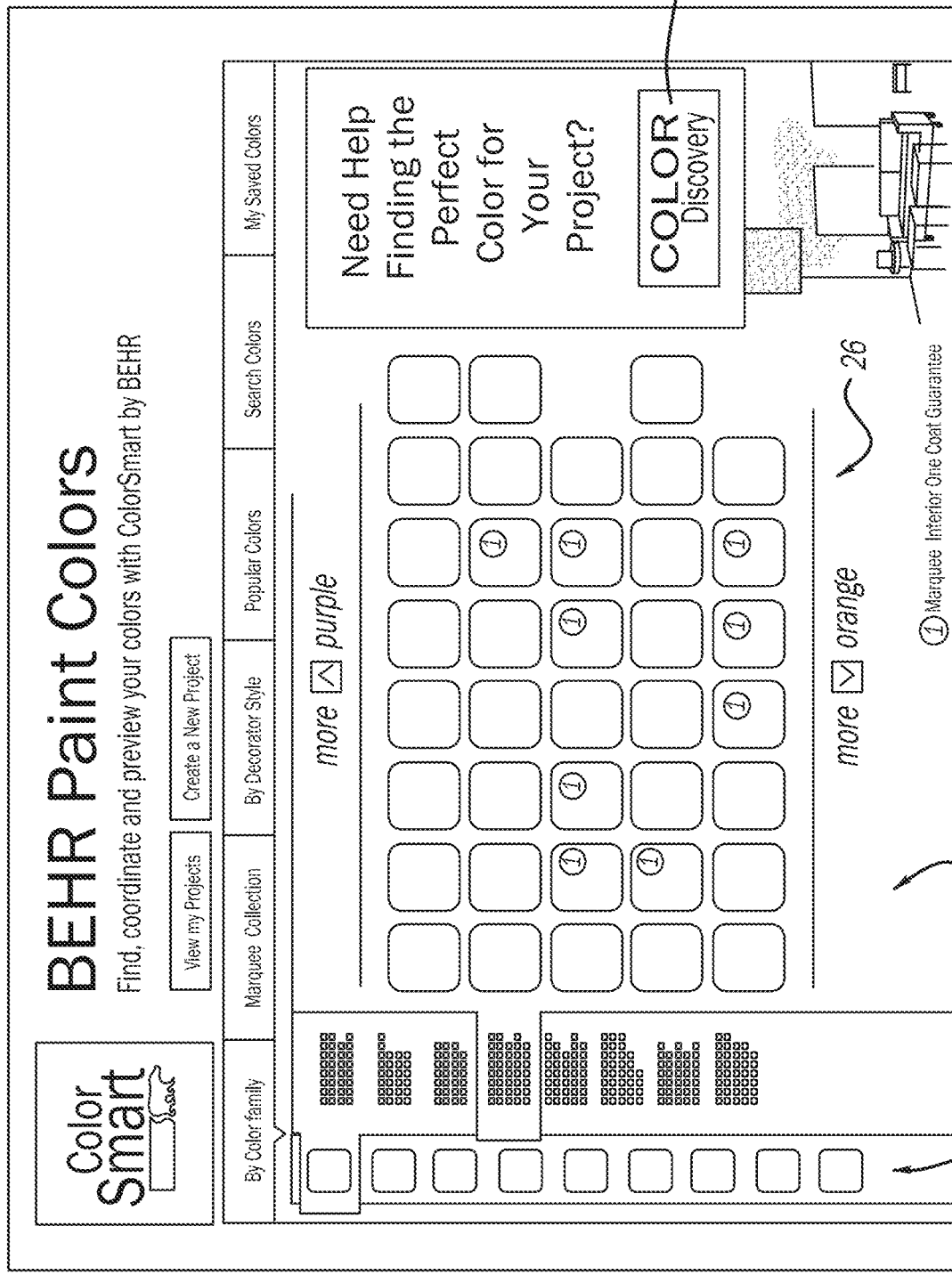
FIG. 2 is a screenshot of a color selection system according to the present disclosure.

With reference to FIG. 2, a screenshot of a first page 20 of a color selection system 10 according to the present disclosure is shown. The first page 20 may be a webpage displayed within a web browser. Alternatively, the first page 20 may be a page of a mobile application. The first page is displayed on a display of the user device 14. The first page 20 includes a color browsing section 22 whereby a user can browse paint colors by color families. For example, a user can select a particular color family from a column 24 of color families. Once a particular color family is selected, individual paint colors 26 associated with the selected color family are shown and a user can select an individual paint color to access additional information about the individual paint color, to view coordinating colors or color palettes for the individual paint color, to view the individual paint color in a simulated environment, etc. As an alternative to browsing and selecting individual paint colors in this manner, the first page 20 also includes a link 28 to a color selection tool according to the present disclosure. While a specific example first page 20 is shown in FIG. 2, any other configurations or layouts of the first page 20 can alternatively be used, with the link 28 to the color selection tool provided somewhere on the first page 20 for the user to access and select/click. Once the user clicks the link 28 to the color selection tool, a second page 30 (shown in FIG. 3) is displayed on the display of the user device 14.

Figure 3:
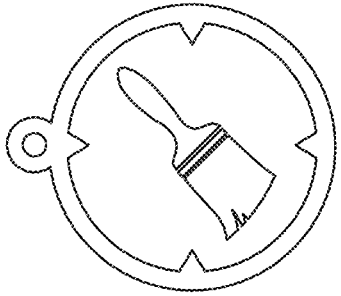
FIG. 3 is a screenshot of a color selection system according to the present disclosure.

With reference to FIG. 3, the second page 30 is an introductory webpage for the color selection tool of the present disclosure. The second page 30 may be a webpage displayed within a web browser. Alternatively, the second page 30 may be a page of a mobile application. In the example of FIG. 3, the user can initiate the color selection tool by clicking on the "Get Started" link 32. Once the user initiates the color selection tool by clicking on the "Get Started" link 32, a third page 40 (shown in FIG. 4) is displayed on the display of the user device 14.

Figure 4:
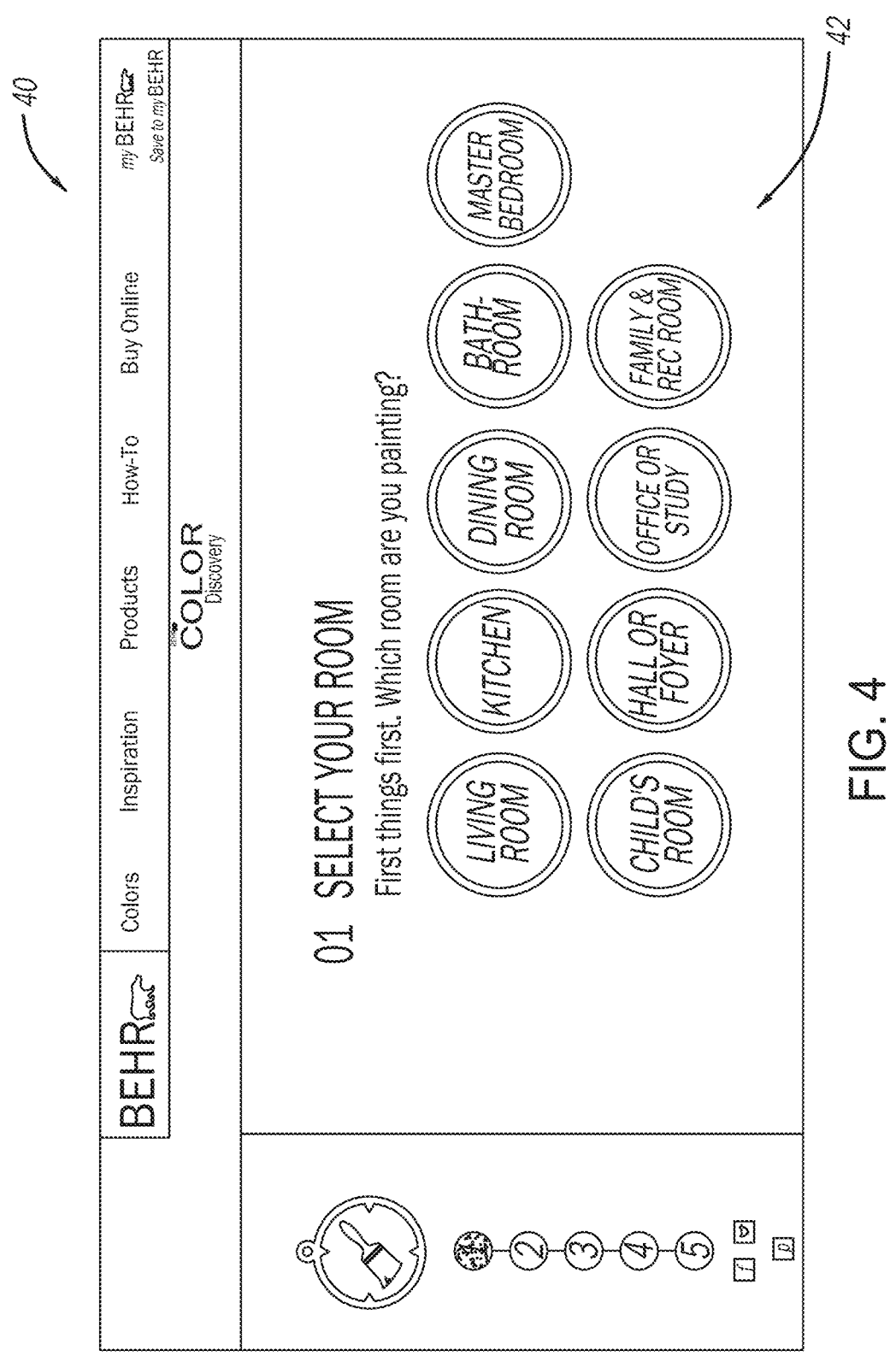
Figure 5:
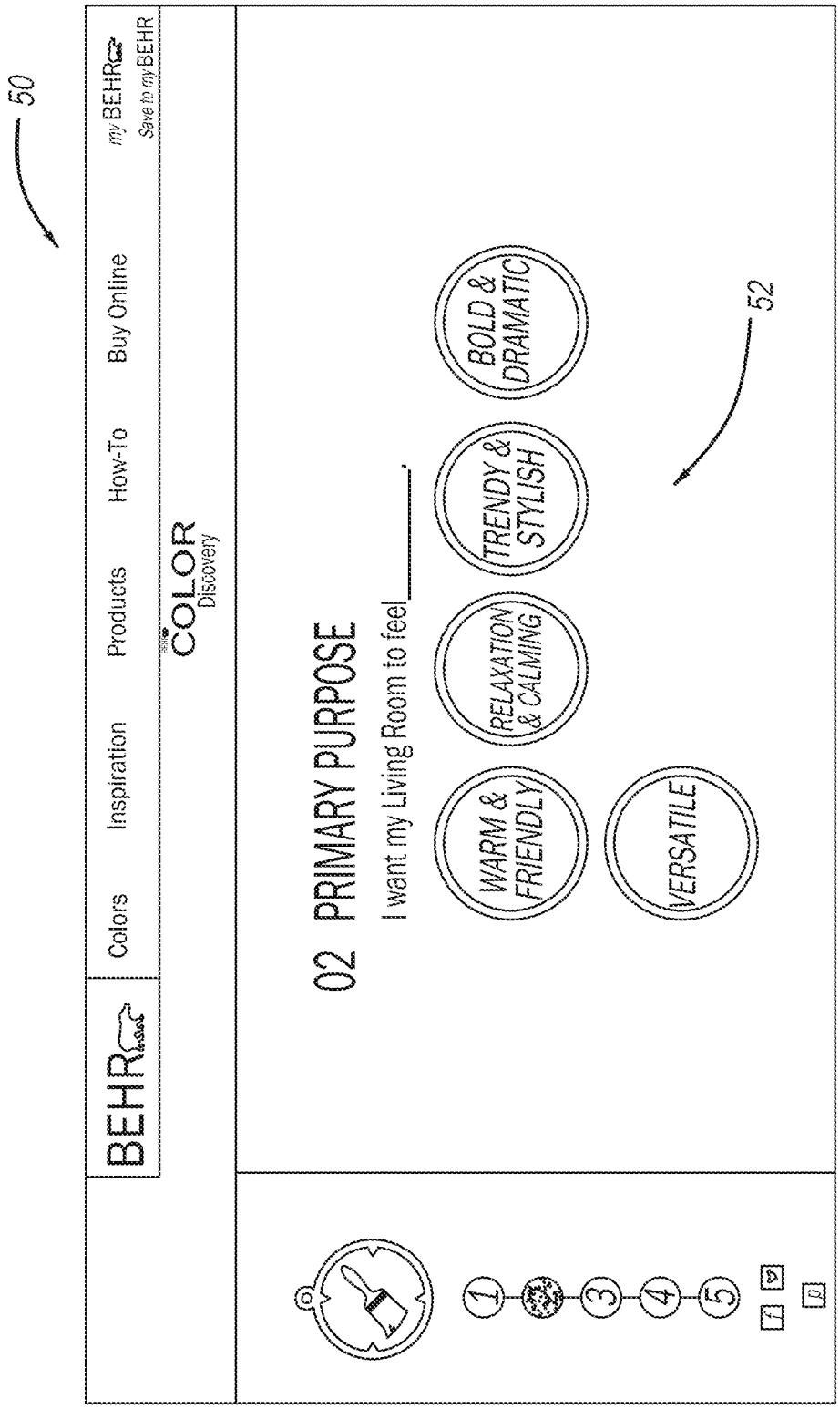
FIG. 5 is a screenshot of a color selection system according to the present disclosure.

With reference to FIG. 4, the third page 40 displays a group of predetermined room types 42 for selection and prompts the user to select a particular room type from the group of predetermined room types 42. The third page 40 may be a webpage displayed within a web browser. Alternatively, the third page 40 may be a page of a mobile application. In the example of FIG. 4, the group of predetermined room types 42 includes "Living Room," "Kitchen," "Dining Room," "Bathroom," "Master Bedroom," "Child's Room," "Hall or Foyer," "Office or Study," and "Family & Rec Room." While these nine room types are shown as an example in FIG. 4, any number of room types may be used. Once the user selects a particular room type from the predetermined room types 42, a fourth page 50 (shown in FIG. 5) is displayed on the display of the user device 14. In the example of FIG. 5, the "Living Room" room type has been selected from the group of predetermined room types 42.

Figure 6:
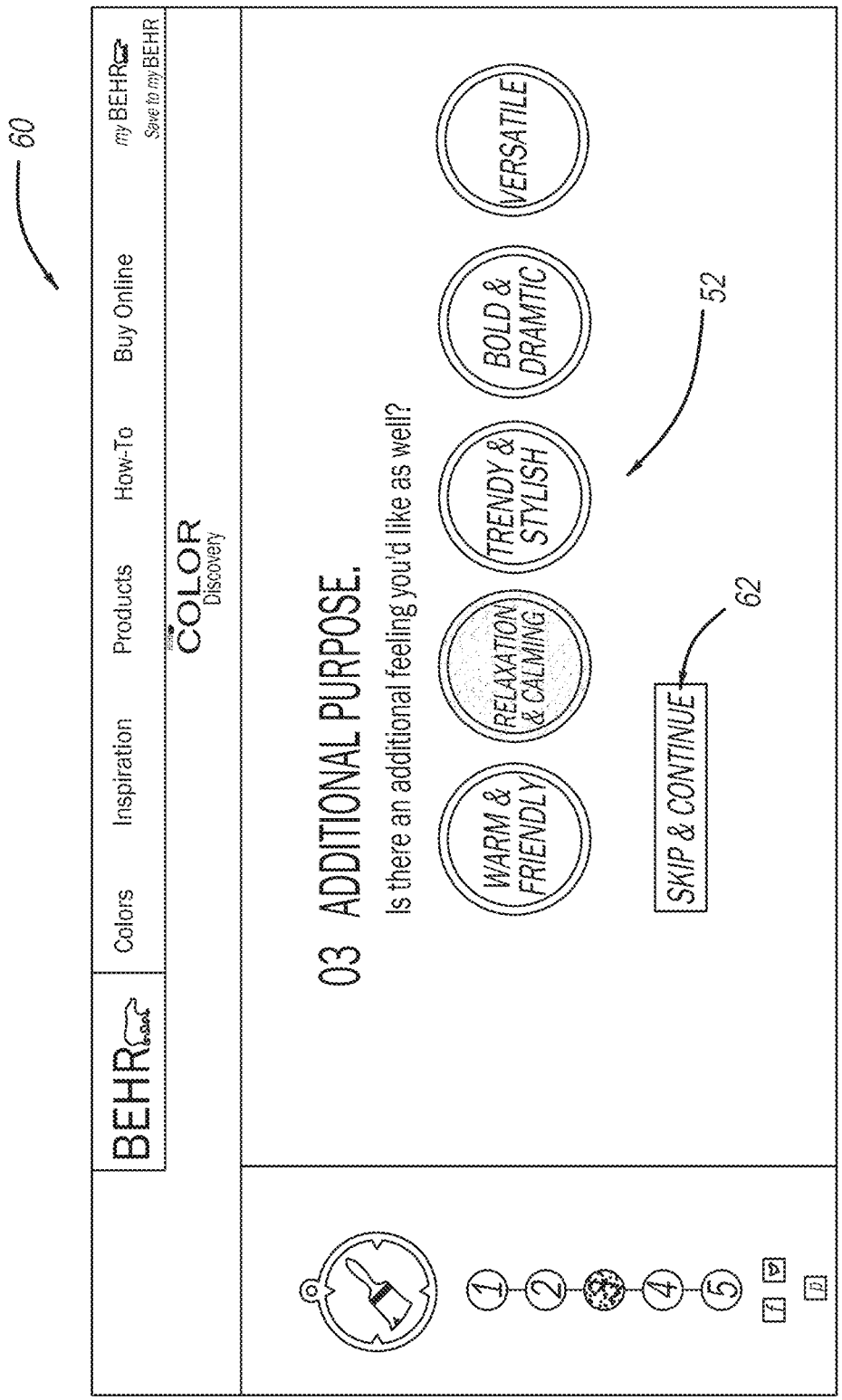
FIG. 6 is a screenshot of a color selection system according to the present disclosure.

With reference to FIG. 5, the fourth page 50 prompts the user to select a "Primary Purpose" or primary feeling for the particular room and displays a predetermined group of different purposes or types of feelings 52 that could be evoked by the particular room for selection. The fourth page 50 may be a webpage displayed within a web browser. Alternatively, the fourth page 50 may be a page of a mobile application. For example, the fourth page prompts the user to select a particular purpose or feeling that user would like to be associated with the particular room once it is painted. In the example of FIG. 5, the different purposes or types of feelings 52 include "Warm & Friendly," "Relaxation & Calming," "Trendy & Stylish," "Bold & Dramatic," and "Versatile." While the example of FIG. 5 provides five different purposes or types of feelings 52, any number of purposes or types of feelings could be used. In addition, while the example of FIG. 5 provides different purposes or types of feelings 52 for the particular room for selection, any type of descriptive phrase or term could be additionally or alternatively be used. The page 50 prompts the user with the phrase "I want my Living Room to feel _____." The user can then select one of the particular purposes or feelings to complete that sentence as the room's "Primary Purpose" or primary feeling. Once the user selects a particular type of feeling from the group of different types of feelings 52, a fifth page 60 (shown in FIG. 6) is displayed on the display device of the user device 14. In the example of FIG. 6, "Relaxation & Calming" has been selected as the "Primary Purpose." Based on the selection, the icon for "Relaxation & Calming" has been grayed out, as shown in FIG. 6, to indicate that it has already been selected.

With reference to FIG. 6, the fifth page 60 prompts the user to select an "Additional Purpose" or secondary feeling for the particular room and displays the predetermined group of different purposes or types of feelings 52 that could be evoked by the particular room for selection, except the previously selected feeling is grayed out. The fifth page 60 may be a webpage displayed within a web browser. Alternatively, the fifth page 60 may be a page of a mobile application. The user can then select a second feeling from the remainder of the predetermined group of different purposes or types of feelings 52. The user can also skip the selection of an "Additional Purpose" or secondary feeling by selecting the "Skip & Continue" button 62.

Once the user either makes the additional purpose or feeling selection or presses the "Skip & Continue" button 62, the user device 14 communicates the selected room type, the selected primary purpose feeling, and the selected additional purpose feeling (if any) to the server 12. The server 12 then accesses the color database 18 to determine the predetermined paint colors associated with the user's selections. For example, the color database 18 stores a lookup table that associates one or more paint colors with each room type and purpose/feeling type combination available for selection. In this way, each possible combination of room type and purpose/feeling type has an entry in the lookup table indicating one or more predetermined paint colors associated with that particular combination of room type and purpose/feeling type. Once the predetermined paint colors associated with the user's selections are retrieved from the color database 18, the server 12 communicates the predetermined paint colors to the user device 14 for display and presentation to the user as the recommended paint colors. Additionally or alternatively, the server 12 may initially communicate the lookup table to the user device 14 at outset when the color selection process is initiated. For example, the server 12 may communicate the lookup table to the user device 14 when the initial code for the initial webpage of the system is provided. Alternatively, if the color selection system 10 is implemented using a mobile application, the lookup table may be included in the code for the mobile application and provided to the user device 14 at the time the mobile application is installed on the user device 14. In this way, the user device 14 can access the lookup table and determine the recommended colors for the selected room type and feelings without the need for additional communication back to the server 12.

With reference to FIG. 7, a portion of an example lookup table 70 is shown. In the example of FIG. 7, the lookup table entries for the "Living Room" room type are shown. More specifically, five predetermined paint colors are shown associated with each of the possible purpose/feeling type selections. While the example of FIG. 7 only shows the lookup table entries for the "Living Room" room type, the lookup table would also include similar entries for each of the other possible room type selections, i.e., "Kitchen," "Dining Room," "Bathroom," "Master Bedroom," "Child's Room," "Hall or Foyer," "Office or Study," and "Family & Rec Room," etc.

As an example using the example lookup table 70 of FIG. 7, when the "Living Room" room type is selected and the "Relaxation & Calming" purpose/feeling type is selected, the lookup table provides the following predetermined five colors as the recommended colors: "Rejuvenation," "Breath," "Fresh Tone," "Journeys End," and "Hazy Trail." As another example, when the "Living Room" room type is selected and the "Warm & Friendly" purpose/feeling type is selected, the lookup table provides the following predetermined five colors as the recommended colors: "Dry Brown," "Spice," "Oregano Spice," "Cork," and Casual Khaki." As further shown in FIG. 7, the example lookup table 70 stores both the color name and the color code for each of the paint colors.

Figure 8:
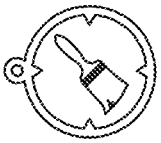
FIG. 8 is a screenshot of a color selection system according to the present disclosure.

With reference again to FIG. 6, once the user either makes an additional feeling selection or presses the "Skip & Continue" button 62, a sixth page 80 (shown in FIG. 8) is displayed on the display device of the user device 14. In the example of FIG. 8, the user selected "Warm & Friendly" as the additional purpose or feeling.

With reference to FIG. 8, the sixth page 80 displays recommended paint colors based on the user's previous selections. The sixth page 80 may be a webpage displayed within a web browser. Alternatively, the sixth page 80 may be a page of a mobile application. In the example of FIG. 8, the user has selected: "Living Room" as the room type; "Relaxation & Calming" as the primary purpose or feeling; and "Warm & Friendly" as the secondary purpose or feeling. As discussed above with reference to FIG. 7, the predetermined colors associated with the "Living Room" room type and the "Relaxation & Calming" feeling type are: "Rejuvenation," "Breath," "Fresh Tone," "Journeys End," and "Hazy Trail." As shown in FIG. 8, those five recommended colors are displayed in a first row 82 of the recommended colors. As further discussed above with reference to FIG. 7, the predetermined colors associated with the "Living Room" room type and the "Warm & Friendly" feeling type are: "Dry Brown," "Spice," "Oregano Spice," "Cork," and Casual Khaki." As shown in FIG. 8, those five recommended colors are displayed in a second row 84 of the recommended colors. As further shown in FIG. 8, the sixth page 80 then prompts the user to select particular colors from the group of recommended colors. In the example of FIG. 8, ten recommended colors are shown and the user is prompted to select up to three colors from the group of ten recommended colors. Once the user selects particular colors from the group of recommended colors, a seventh page 90 (shown in FIG. 9) is displayed on the display of the user device 14.

Figure 9:
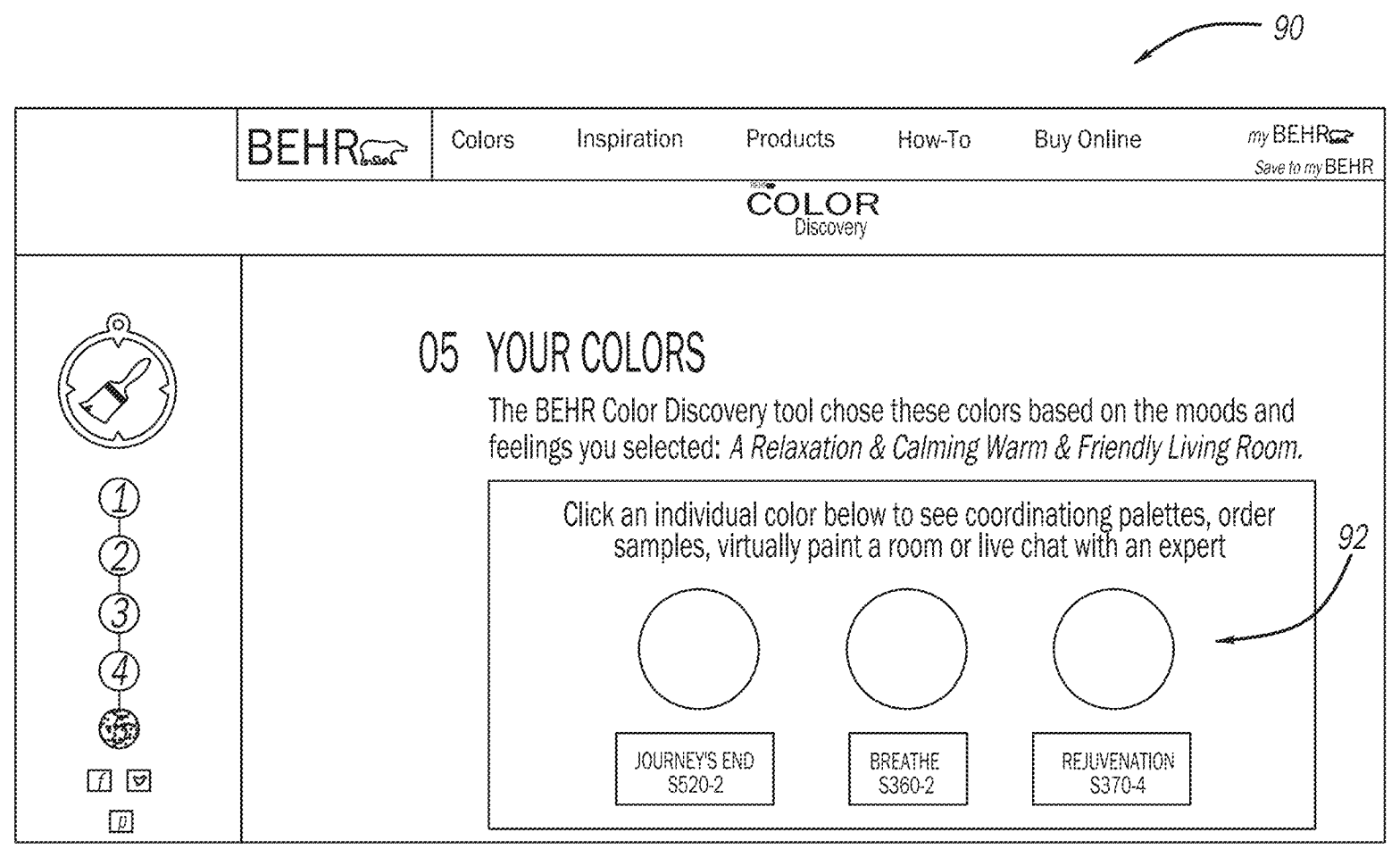

With reference to FIG. 9, the seventh page 90 displays the particular colors 92 selected by the user from the group of recommended colors. The seventh page 90 may be a webpage displayed within a web browser. Alternatively, the seventh page 90 may be a page of a mobile application. In the example of FIG. 9, the colors "Journey's End," Breathe," and "Rejuvenation" have been selected from the group of ten recommended colors and are displayed for the user. The seventh page 90 also prompts the user to click on an individual color to see coordinating color palettes for the individual color, to order samples of the individual color, to virtually paint a room (i.e., a simulated environment showing the individual paint color), or live chat with an expert regarding the individual color. Once the user selects an individual color, an eighth page 100 (shown in FIG. 10) is displayed on the display of the user device 14.

Figure 10:
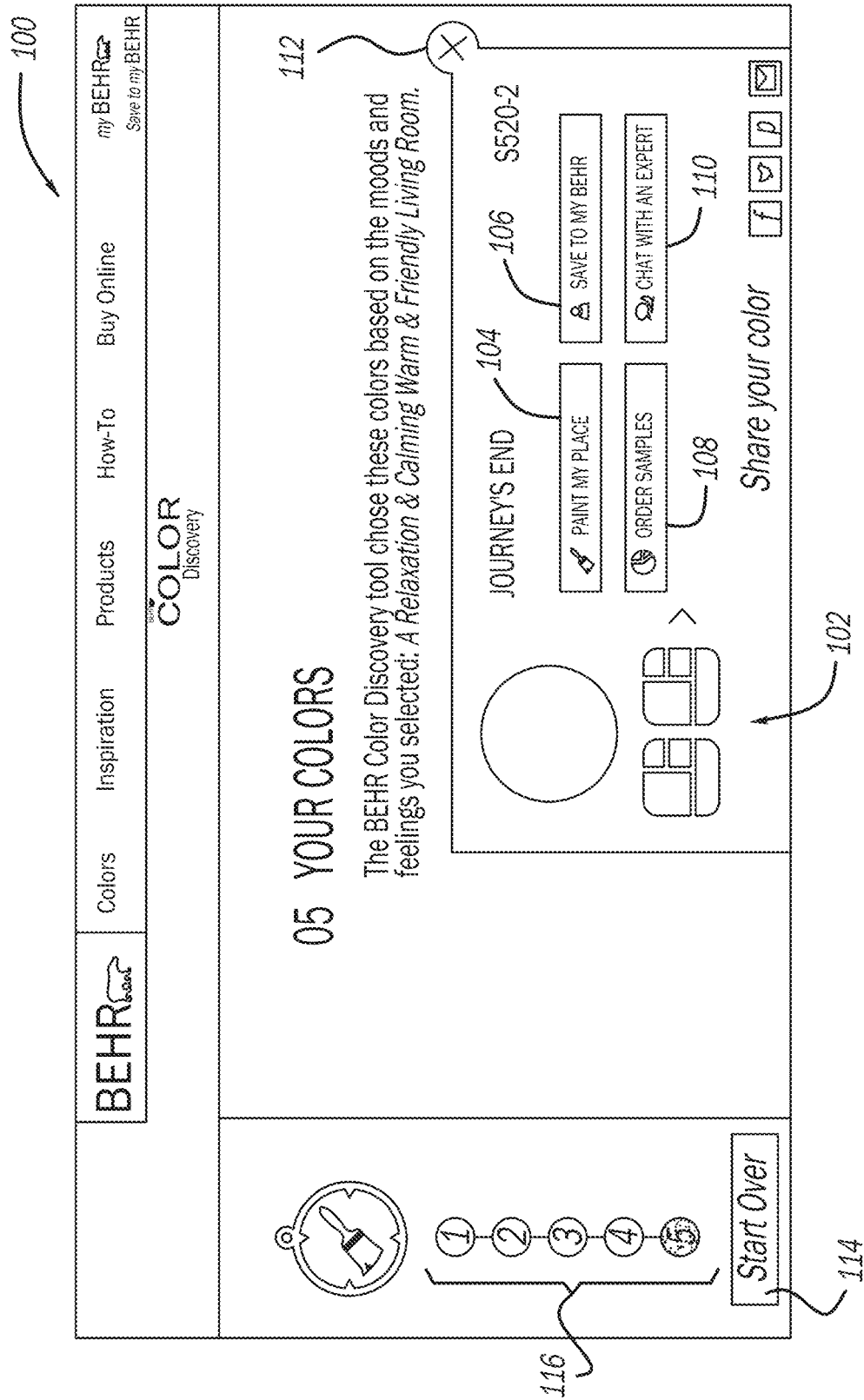
FIG. 10 is a screenshot of a color selection system according to the present disclosure.

With reference to FIG. 10, the eighth page 100 displays a particular individual paint color selected from the previous group of three paint colors. The eighth page 100 may be a webpage displayed within a web browser. Alternatively, the eighth page 100 may be a page of a mobile application. In the example of FIG. 10, the paint color "Journey's End" has been selected and is displayed. In addition, multiple coordinating color palettes 102 for the selected paint color are shown. In the example of FIG. 10, two coordinating color palettes 102 are shown and the user can select an arrow to the right to view additional coordinating color palettes 102. The eighth page 100 also provides a link 104 to "Paint My Place," which enables the user to view the selected paint color in a simulated environment, such as a picture of a living room, as described, for example, U.S. Pat. No. 7,230,629, titled "Data-driven color coordinator," which is incorporated herein by reference. The eighth page 100 also provides a link 106, which enables the user to save the selected color for later retrieval. For example, the selected color and/or the color palettes can be saved on the server 12 associated with a user identification of the particular user. In this way, the user can logon to the system at a later time and retrieve any saved colors. The eighth page 100 also provides a link 108, which enables the user to order a sample of the selected color. The eighth page 100 also provides a link 110, which initiates a chat session with an expert. The expert, for example, can answer any questions from the user about the particular color, about the designated coordinating colors, about the paint project in general, etc. The eighth webpage 100 also provides a link 112, which enables the user to close the window for the currently selected color and return to the selection of colors shown in FIG. 9.

Throughout the process described above with reference to FIGS. 4 through 10, the user can select a "Start Over" link 114 to restart the color selection process from the beginning. The user can also select one of the links 116 to return to a particular previous step in the color selection process.

Figure 11:
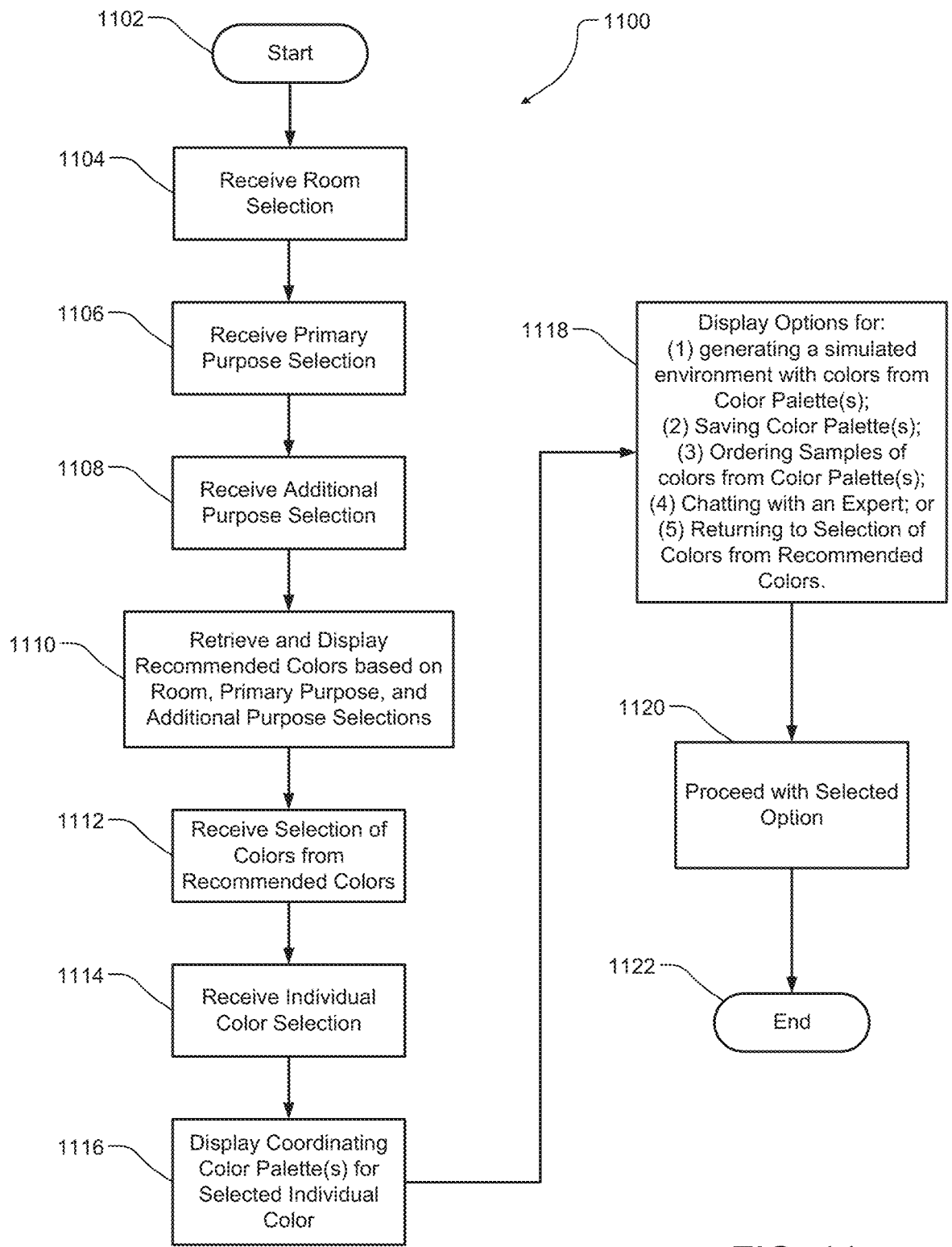
FIG. 11 is a flow chart for a color selection method according to the present disclosure.

With reference to FIG. 11, a flow chart for a color selection method 1100 according to the present disclosure is illustrated. The method 1100 can be executed by the user device 16 alone or in coordination with the server 12 shown in FIG. 1A. For example, the method 1100 can be executed by the tablet or mobile device 15 alone or in coordination with the server 12 shown in FIG. 1B. The method 1100 starts at 1102. At 1104, a room selection is received by the user device. The room selection, for example, may be received by a selection in the third page 40, as discussed in detail with reference to FIG. 4 above.

At 1106, a primary purpose or feeling selection is received by the user device 14. The primary purpose or feeling selection, for example, may be received by a selection in the fourth page 50, as discussed in detail with reference to FIG. 5 above.

At 1108, an additional or secondary purpose or feeling selection is received by the user device 14. The additional or secondary purpose or feeling selection, for example, may be received by a selection in the fifth page 60, as discussed in detail with reference to FIG. 6 above.

At 1110, the user device 14 retrieves the recommended colors associated with the selected room type, primary purpose or feeling, and the additional or secondary purpose or feeling, if any. As discussed above with reference to FIG. 7, the user device 14 may communicate the room and purpose/feeling selections to the server 12 and the server may access the color database 18 to retrieve the recommended colors associated with the room type and purpose/feeling selections. Additionally or alternatively, as discussed in detail above, the server 12 may initially communicate the lookup table to the user device 14 at outset when the color selection process is initiated. In this way, the user device 14 can access the lookup table and determine the recommended colors for the selected room type and feelings without the need for additional communication back to the server 12.

Once the recommended colors are received or determined, the user device also displays the recommended colors received from the server at 1110. The recommended colors, for example, may be displayed by the sixth webpage 80, as discussed in detail with reference to FIG. 8 above.

At 1112, the user device 14 receives a selection of individual colors from the group of recommended colors. The individual colors selected from the group of recommended colors may be displayed, for example, by the seventh webpage 90, as discussed in detail with reference to FIG. 9 above.

At 1114, the user device 14 receives an individual color selection from previously selected group of colors. The selected individual color may be displayed, for example, as discussed in detail with reference to FIG. 10 above. At 1116, the user device 14 displays coordinating color palette(s) 102 for the selected individual color, as shown in FIG. 10. For example, the color database 18 can store predetermined coordinating colors and color palette(s) for each paint color in the color database 18. In this way, the server 12 can determine coordinating colors and color palette(s) for each paint color in the color database 18. Additionally or alternatively, the server 12 can communicate the coordinating colors and color palette(s) to the user device 14 at the outset. In such case, the user device 14 does not need to communicate with the server 12 to determine coordinating colors and color palette(s). Additionally or alternatively, in the event a mobile application is used, the coordinating colors and color palette(s) can be provided to the user device 14 with the code for the mobile application.

At 1118, the user device 14 displays an option for generating a simulated environment with colors from the color palette(s), including the individual selected color. As discussed in detail above, the eighth page 100 provides a link 104 to "Paint My Place," which enables the user to view the selected paint color in a simulated environment, such as a picture of a living room, as described, for example, U.S. Pat. No. 7,230,629, titled "Data-driven color coordinator," which is incorporated herein by reference. At 1118, the user device 14 also displays an option for saving the color palette(s), including the individual selected color. As discussed in detail above, the eighth page 100 provides a link 106, which enables the user to save the selected color for later retrieval. For example, the selected color and/or the color palettes can be saved on the server 12 associated with a user identification of the particular user. In this way, the user can logon to the system at a later time and retrieve any saved colors. At 1118, the user device 14 also displays an option for ordering samples of the colors from the color palette(s), including the individual selected color. As discussed above, the eighth page 100 provides a link 108, which enables the user to order a sample of the selected color. At 1118, the user device 14 also displays an option for chatting with an expert. As discussed above, the eighth page 100 provides a link 110, which initiates a chat session with an expert. The expert, for example, can answer any questions from the user about the particular color, about the designated coordinating colors, about the paint project in general, etc. At 1118, the user device 14 also displays an option for returning to the selection of colors from the recommended colors. As discussed above, the eighth page 100 also provides a link 112, which enables the user to close the window for the currently selected color and return to the selection of colors shown in FIG. 9.

At 1120, the user device 14 proceeds with execution of the option selected at step 1118. At 1122, the color selection method 1100 ends.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terms server, user device, and module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The servers, user devices, apparatuses, and methods described in this application may be partially or fully implemented with or by one or more computer programs executed by one or more processors. The computer programs include processor-executable instructions that are stored on at least one non-transitory tangible computer readable medium. The computer programs may also include and/or rely on stored data.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A user device having a computer-readable medium storing computer-executable instructions that, when executed by a user device, configure the user device to:
   display a plurality of room types on a display of the user device;
   receive a room type selection indicating a particular room type from the plurality of room types displayed on the display of the user device;
   display a plurality of types of feelings on the display;
   receive a type of feeling selection indicating a particular type of feeling from the plurality of types of feelings displayed on the display of the user device;
   access a lookup table that associates the plurality of room types and the plurality of types of feelings with a plurality of paint colors such that each possible combination of room type from the plurality of room types and type of feeling from the plurality of types of feelings is associated with a subset of paint colors from the plurality of paint colors
   determine the associated subset of paint colors in the lookup table for the combination of the particular room type and the particular type of feeling; and
   display the associated subset of paint colors as recommended paint colors for the combination of the particular room type and the particular type of feeling on the display of the user device.

2. The user device recited by claim 1, wherein the computer-executable instructions, when executed by the user device, further configure the user device to:
   send the room type selection and the type of feeling selection to a web server that stores the lookup table; and
   receive the associated subset of paint colors for the combination of the particular room type and the particular type of feeling from the web server.

3. The user device recited by claim 1, wherein the computer-executable instructions, when executed by the user device, further configure the user device to access the lookup table stored in a memory of the user device.

4. The user device recited by claim 1, wherein the computer-executable instructions are executable within a web browser of the user device.

5. The user device recited by claim 1, wherein the computer-executable instructions are included in a mobile application that is executable by the user device.

6. The user device recited by claim 1, wherein the user device is at least one of a mobile device and a tablet.

7. The user device recited by claim 1, wherein the computer-executable instructions, when executed by the user device, further configure the user device to receive a color selection of at least one selected paint color from the associated subset of paint colors for the combination of the particular room type and the particular type of feeling and to determine and display at least one of a coordinating color and a coordinating color palette for the at least one selected paint color.

8. A method comprising:
- displaying, with a user device, a plurality of room types on a display of the user device;
- receiving, with the user device, a room type selection indicating a particular room type from the plurality of room types displayed on the display of the user device;
- displaying, with the user device, a plurality of types of feelings on the display;
- receiving, with the user device, a type of feeling selection indicating a particular type of feeling from the plurality of types of feelings displayed on the display of the user device;
- accessing, with the user device, a lookup table that associates the plurality of room types and the plurality of types of feelings with a plurality of paint colors such that each possible combination of room type from the plurality of room types and type of feeling from the plurality of types of feelings is associated with a subset of paint colors from the plurality of paint colors
- determining, with the user device, the associated subset of paint colors in the lookup table for the combination of the particular room type and the particular type of feeling; and
- displaying, with the user device, the associated subset of paint colors as recommended paint colors for the combination of the particular room type and the particular type of feeling on the display of the user device.

9. The method recited by claim 8, further comprising:
- sending, with the user device, the room type selection and the type of feeling selection to a web server that stores the lookup table; and
- receiving, with the user device, the associated subset of paint colors for the combination of the particular room type and the particular type of feeling from the web server.

10. The method recited by claim 8, further comprising accessing, with the user device, the lookup table stored in a memory of the user device.

11. The method recited by claim 8, wherein the user device is at least one of a mobile device and a tablet.

12. The method recited by claim 8, further comprising:
- receiving, with the user device, a color selection of at least one selected paint color from the associated subset of paint colors for the combination of the particular room type and the particular type of feeling; and
- determining and displaying, with the user device, at least one of a coordinating color and a coordinating color palette for the at least one selected paint color.

13. A system comprising:
- a user device in communication with a web server configured to store a lookup table that associates a plurality of room types and a plurality of types of feelings with a plurality of paint colors such that each possible combination of room type from the plurality of room types and type of feeling from the plurality of types of feelings is associated with a subset of paint colors from the plurality of paint colors, the user device being configured to execute code that, when executed by the user device, configures the user device to display the plurality of room types on a display of the user device, to receive a room type selection indicating a particular room type from the plurality of room types displayed on the display of the user device, to display the plurality of types of feelings on the display, to receive a type of feeling selection indicating a particular type of feeling from the plurality of types of feelings displayed on the display of the user device, to access the lookup table stored on the web server and determine the associated subset of paint colors in the lookup table for the combination of the particular room type and the particular type of feeling, and to display the associated subset of paint colors as recommended paint colors for the combination of the particular room type and the particular type of feeling on the display of the user device.

14. The system of claim 13, wherein the code, when executed by the user device, further configures the user device to send the room type selection and the type of feeling selection to the web server and to receive the associated subset of paint colors for the combination of the particular room type and the particular type of feeling from the web server.

15. The system of claim 13, wherein the web server is configured to communicate the lookup table to the user device.

16. The system of claim 13, wherein the web server is further configured to store the code and to communicate the code to the user device.

17. The system of claim 13, wherein the code is executable by the user device within a web browser of the user device.

18. The system of claim 13, wherein the code is included in a mobile application that is executable by the user device.

* * * * *